(12) United States Patent
Konno

(10) Patent No.: US 6,549,429 B2
(45) Date of Patent: Apr. 15, 2003

(54) SWITCHING-POWER SUPPLY UNIT FOR REDUCING POWER CONSUMPTION IN A STAND-BY-MODE

(75) Inventor: Akira Konno, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/774,898

(22) Filed: Jan. 31, 2001

(65) Prior Publication Data

US 2001/0010638 A1 Aug. 2, 2001

(30) Foreign Application Priority Data

Jan. 31, 2000  (JP) ........................................ 2000-027414

(51) Int. Cl.[7] ............................................ H02M 3/335
(52) U.S. Cl. ................................ 363/21.04; 363/21.09; 363/97
(58) Field of Search ............................... 363/20, 21.01, 363/21.04, 21.05, 21.09, 97

(56) References Cited

U.S. PATENT DOCUMENTS

| 4,912,617 A | * | 3/1990 | Hartmann et al. | ............ 363/21 |
| 4,937,728 A | * | 6/1990 | Leonardi | ...................... 363/97 |
| 4,941,078 A | * | 7/1990 | Leonardi | ...................... 363/97 |
| 5,390,100 A | * | 2/1995 | Palata | ......................... 363/19 |
| 5,703,764 A | * | 12/1997 | Hermann et al. | ............. 363/21 |
| 5,764,495 A | * | 6/1998 | Faulk | .......................... 363/21 |
| 6,088,243 A | * | 7/2000 | Shin | ............................ 363/97 |
| 6,104,622 A | * | 8/2000 | Shin | ............................ 363/21 |

* cited by examiner

*Primary Examiner*—Jeffrey Sterrett
(74) *Attorney, Agent, or Firm*—Sonnenschein, Nath & Rosenthal

(57) ABSTRACT

In a normal operation mode, a mode changeover controller 8 continuously operates a PWM control circuit 6 so as to operate a switching element 5 at the basic oscillation frequency. In a standby mode, the mode changeover controller 8 intermittently operates the PWM control circuit 6 so as to turn on the switching element 5 at a given repetition interval and for a given time period. This repetition interval is shorter than a time for decreasing an output voltage from a rectifying and smoothing circuit 20 down to a guaranteed load operating voltage due to power consumption of the load and the rectifying and smoothing circuit 20 in the standby mode and is longer than a time for entering a sonic frequency band. That time period is longer than a time for stabilizing an output from the rectifying and smoothing circuit 20 and is longer than a time for entering a sonic frequency band.

2 Claims, 3 Drawing Sheets

SWITCHING-POWER SUPPLY UNIT FOR REDUCING POWER CONSUMPTION IN A STAND-BY-MODE

BACKGROUND OF THE INVENTION

1. Technical Field

The present invention relates to a switching power-supply unit for pulse width modulation (PWM) systems, frequency-control or phase-control systems using resonance and the like.

2. Prior Art

Conventionally, a widely used switching power-supply unit switches a direct current generated from a rectified and smoothed commercial alternating current at a high frequency such as, say, 100 kHz and effectively converts the current to a desired voltage using a transformer.

This switching power-supply unit uses output voltage control systems such as a PWM control system which controls a duty ratio of switching pulses according to output voltage changes, a frequency-control or phase-control system using resonance and the like which controls switching pulse frequencies or phases.

A PWM-controlled switching power-supply unit provides control to narrow an ON duty for stabilizing an output voltage when a load power becomes extremely small during a wait state in which no current is loaded. It is impossible to zero an ON duty for maintaining constant oscillation A constant ON duty is ensured by providing a dummy resistor.

Accordingly, in the PWM-controlled switching power-supply unit, a power needed for the dummy resistor prevents power consumption from being minimized.

When no dummy resistor is used, increasing an output voltage zeros the ON duty to stop the oscillation for stabilizing the output voltage. As the oscillation stops and the output voltage decreases repeatedly, an intermittent oscillation occurs at 5 to 10 kHz. This intermittent oscillation decreases a switching frequency to a sonic frequency band, and may generate a grating noise at an inconsistent cycle.

A resonance-control switching power-supply unit provides control to increase an oscillation frequency for stabilizing an output voltage when a load power becomes extremely small during a wait state in which no current is loaded. However, increasing an oscillation frequency also increases losses in transformers and switching elements, thus preventing power consumption from being minimized.

BRIEF SUMMARY OF THE INVENTION

The present invention has been made in consideration of the foregoing with respect to a conventional switching power-supply unit. It is therefore an object of the present invention to provide a switching power-supply unit which minimizes power consumption during a wait state without generating a grating noise.

The above object can be attained by providing a switching power-supply unit having a rectifier circuit for converting an alternating current from an alternating power supply to a direct current, a switching element for switching a current rectified by this rectifier circuit, and a primary coil for supplying a current to be switched by this switching element, including:

a transformer having a secondary coil for inducing power corresponding to current supplied to this primary coil;

DC output means for rectifying and smoothing a power induced at this transformer's secondary coil to output a secondary direct current power;

switching control means for controlling a switching operation of said switching element so as to output a specified voltage from this DC output means; and control means for controlling operations of said switching control means, wherein said control means, in the normal operation mode, continuously operates said switching control means so as to operate said switching element at a basic oscillation frequency, wherein said control means, in the standby mode, intermittently operates said switching control means so as to turn on said switching element at a given repetition interval and for a given time period, wherein that repetition interval is shorter than a time for decreasing an output voltage from said DC output means down to a guaranteed load operating voltage due to power consumption of the load and said DC output means in the standby mode and is longer than a time for entering a sonic frequency band, and wherein that time period is longer than a time for stabilizing an output from said DC output means and is longer than a time for entering a sonic frequency band.

A switching power-supply unit according to the present invention can minimize power consumption during a wait state without generating a grating noise by continuously operating the switching control means in the normal operation mode so as to operate the switching element at a basic oscillation frequency, or by intermittently operating the switching control means in the standby mode so as to turn on the switching element at a given repetition interval and for a given time period, wherein that repetition interval is shorter than a time for decreasing an output voltage from the DC output means down to a guaranteed load operating voltage due to power consumption of the load and the DC output means in the standby mode and is longer than a time for entering a sonic frequency band, and wherein that time period is longer than a time for stabilizing an output from the DC output means and is longer than a time for entering a sonic frequency band.

DETAILED DESCRIPTION OF THE INVENTION

Embodiments of the present invention will be described in further detail with reference to the accompanying drawings.

Figure 1:
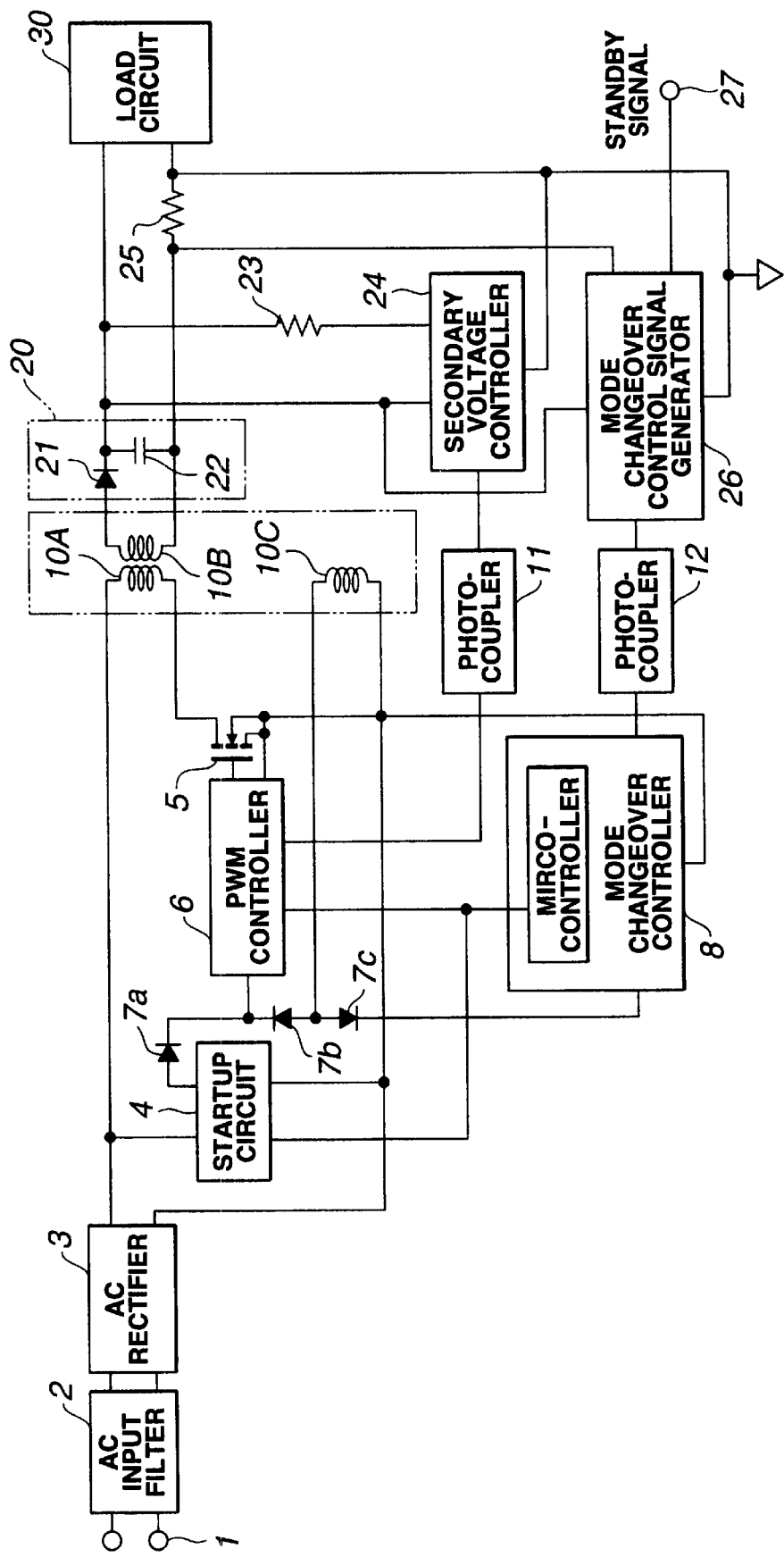
FIG. 1 is a block circuit diagram showing a configuration of a switching power-supply unit according to the present invention.

For example, a switching power-supply unit according to the present invention is configured as shown in FIG. 1. The switching power-supply unit in FIG. 1 comprises an AC rectifier 3 connected to a commercial power input terminal 1 via an AC input filter 2. The AC rectifier 3 is supplied with AC power from the commercial power input terminal 1 via the AC input filter 2. The AC rectifier 3 rectifies and smoothes the AC power to convert it to DC power for output. The AC rectifier 3 is connected with a startup circuit 4 and with a primary coil 10A of a converter transformer 10 via a switching element 5.

A secondary coil 10B of the converter transformer 10 is connected with a rectifying and smoothing circuit 20 comprising a diode 21 and a capacitor 22. The rectifying and smoothing circuit 20 is connected with a secondary voltage controller 24 via a voltage detection resistor 23. Further, the rectifying and smoothing circuit 20 is connected with a mode changeover control signal generator 26 and a load circuit 30 via a current detection resistor 25. Power terminals of the secondary voltage controller 24 and the mode changeover control signal generator 26 are supplied with a rectified and smoothed output as drive power from the rectifying and smoothing circuit 20. The mode changeover control signal generator 26 is supplied with a standby signal via a standby signal input terminal 27. The secondary voltage controller 24 and the mode changeover control signal generator 26 use CMOS (Complementary Metal Oxide Semiconductor) ICs to minimize power consumption as low as 50 $\mu$A.

This switching power-supply unit is based on the pulse width modulation (PWM). The switching power-supply unit uses a PWM control circuit 6 to PWM-control switching operations of the switching element 5 in response to a control output from the secondary voltage controller 24. The PWM control circuit 6 uses a CMOS IC chip which consumes 8 $\mu$A current in standby mode.

The PWM control circuit 6 is supplied with an activation output from the startup circuit 4 via a diode 7a. A ternary output from a ternary coil 10C of the converter transformer 10 is supplied to a power terminal via a diode 7b. The PWM control circuit 6 is supplied with a control output from the secondary voltage controller 24 via a photo-coupler 11.

The switching power-supply unit comprises a mode changeover controller 8 which is supplied with a mode changeover control signal from the mode changeover control signal generator 26 via a photo-coupler 12. The mode changeover controller 8 uses a 14-bit core one-chip microcomputer PIC12C671 manufactured by Microchips, Inc. The PIC12C671 consumes a current of 7 $\mu$A in sleep mode. The mode changeover controller 8's power terminal is supplied with a ternary output from the ternary coil 10C of the converter transformer 10 via a diode 7c. The mode changeover controller 8 controls operations of the startup circuit 4 and the PWM control circuit 6 according to a mode changeover control signal supplied from the mode changeover control signal generator 26 via the photo-coupler 12. In the normal operation mode, the mode changeover controller 8 continuously operates the PWM control circuit 6 so as to operate the switching element 5 at the basic oscillation frequency. In the standby mode, the mode changeover controller 8 intermittently operates the PWM control circuit 6 so as to turn on the switching element 5 at a given repetition interval and for a given time period. This repetition interval is shorter than a time for decreasing an output voltage from the rectifying and smoothing circuit 20 down to a guaranteed load operating voltage due to power consumption of the load and the rectifying and smoothing circuit 20 in the standby mode and is longer than a time for entering a sonic frequency band. The time period is longer than a time for stabilizing an output from the DC output means and is longer than a time for entering a sonic frequency band.

The photo-couplers 11 and 12 are signal couplers for returning a signal from the secondary side to the primary side. These couplers are low power-consuming, normally closed photo-couplers using optical MOS devices for saving currents on standby.

In the thus configured switching power-supply unit, the AC rectifier 3 is supplied with an AC current from the commercial power input terminal 1 via the AC input filter 2. The AC rectifier 3 outputs a DC power by rectifying and smoothing the supplied AC power. At this time, the DC power activates the startup circuit 4 to supply an activation signal to the PWM control circuit 6. The PWM control circuit 6 starts oscillation at a frequency of approximately 100 kHz. An oscillation output from the PWM control circuit 6 allows the switching element 5 to perform a switching operation. The switching element 5 switches a DC current supplied from the AC rectifier 3 to the primary coil 10A of the converter transformer 10. The converter transformer 10 generates a secondary output and a ternary output at the secondary coil 10B and the ternary coil 10C, respectively.

The ternary output generated at the converter transformer 10's ternary coil 10C is used as a drive power for the PWM control circuit 6 and the mode changeover controller 8.

The secondary output generated at the converter transformer 10's secondary coil 10B is rectified and smoothed in the rectifying and smoothing circuit 20. This output is used as a drive power for the secondary voltage controller 24 and the mode changeover control signal generator 26. The secondary output is supplied to the load circuit 30 via the current detection resistor 25.

The secondary voltage controller 24 detects a DC output voltage rectified and smoothed by the rectifying and smoothing circuit 20 via the voltage detection resistor 23. The secondary voltage controller 24 compares this DC output voltage with the reference voltage to obtain an error voltage. The secondary voltage controller 24 returns a control output corresponding to this error voltage to the PWM control circuit 6 via the photo-coupler 11.

The PWM control circuit 6 PWM-controls switching operations of the switching element S by varying oscillation output pulse widths according to the control output, namely the error voltage returned from the secondary voltage controller 24.

It is possible to stabilize a DC current output voltage supplied to the load circuit 30 from the rectifying and smoothing circuit 20 by PWM-controlling switching operations of the switching element 5.

This switching power-supply unit operates in the normal operation mode as mentioned above.

In the normal operation mode of this switching power-supply unit, the mode changeover control signal generator 26 detects via the current detection resistor 25 that a current to the load circuit 30, namely a load consumption current, falls below a specified value, say, 2 mA. Alternatively, the mode changeover control signal generator 26 is supplied with a standby signal via the standby signal input terminal 27. In these cases, the mode changeover control signal generator 26 supplies the mode changeover controller 8 via the photo-coupler 12 with a mode changeover control signal for enabling the standby mode.

When the mode changeover control signal generator 26 supplies a mode changeover control signal for enabling the standby mode, the mode changeover controller 8 makes preparations for switching from the normal operation mode to the standby mode. When the mode changeover control signal is supplied for a specified time, say, 2 seconds, the mode changeover controller 8 controls to change the normal operation mode to the standby mode.

In the standby mode, the mode changeover controller 8 supplies a standby signal indicating the standby mode to the startup circuit 4 and the PWM control circuit 6, then stops the startup circuit 4 to place the PWM control circuit 6 into a standby state.

In the standby mode, the mode changeover control signal generator 26 checks if a current supplied to the load circuit 30, namely a load consumption current increases. Alternatively, the mode changeover control signal generator 26 checks if a standby signal supplied via the standby signal input terminal 27 is released. The mode changeover control signal generator 26 makes these checks through the intermediation of the current detection resistor 25. When a change occurs, the mode changeover control signal generator 26 supplies a mode changeover control signal enabling the normal operation mode to the mode changeover controller 8 via the photo-coupler 12.

The mode changeover controller 8 controls operation modes using interrupt processing. Namely, when receiving an interrupt by a mode changeover control signal for enabling the normal operation mode, the mode changeover controller 8 immediately supplies the startup circuit 4 and the PWM control circuit 6 with a wakeup signal for enabling the normal operation mode. The mode changeover controller 8 then restores operations of the startup circuit 4 and the PWM control circuit 6 to the normal operation mode.

Figure 2:
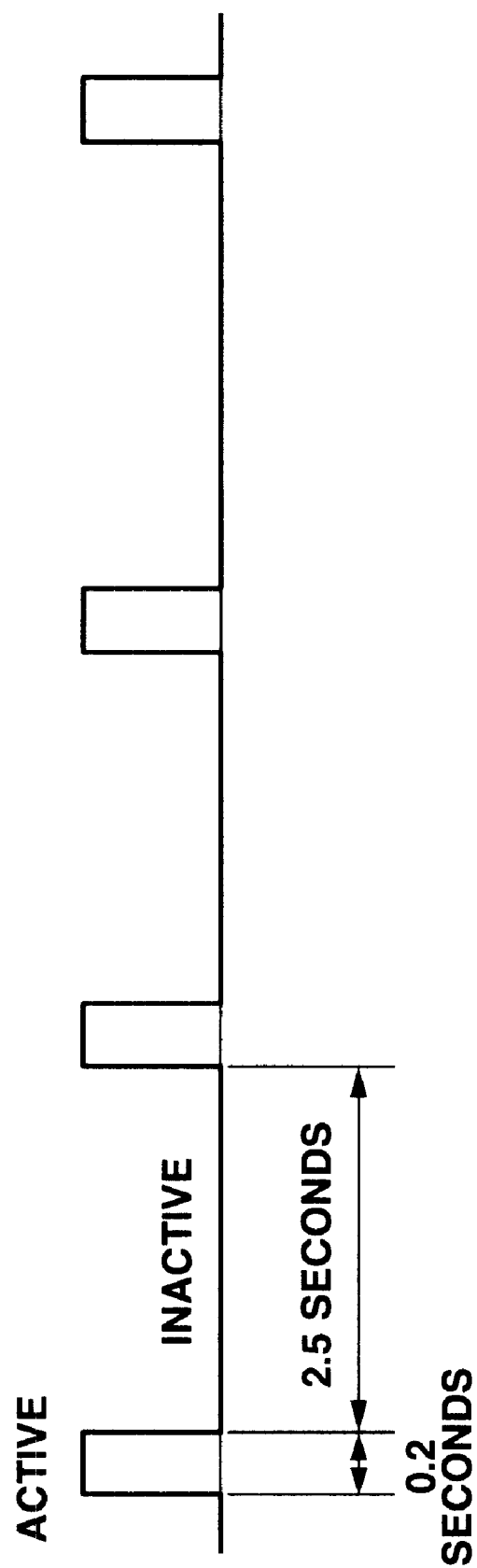
FIG. 2 is a time chart illustrating a switching operation in wait mode for the switching power-supply unit.

As shown in FIG. 2, an inactive state may continue for a specified period, say, 2.5 seconds or more to apply no interrupt to a mode changeover control signal for enabling the normal operation mode. In this case, the mode changeover controller 8 forcibly supplies a wakeup signal to the startup circuit 4 and the PWM control circuit 6 for, say, 0.2 seconds to operate these circuits for stabilizing a secondary output voltage. For waking up from the standby state, it is possible to use various signals such as an increased load current, a signal from the set, and the like.

In the normal operation mode, this switching power-supply unit operates as a PWM-controlled switching regulator by using a basic oscillation frequency at approximately 100 kHz as the first frequency. In the standby mode, the switching power-supply unit performs a switching operation with the fixed ON duty at the second frequency which is fixed to a very longer cycle than for the first frequency. This minimizes power consumption in the standby mode.

The second frequency in this example uses the frequency of 0.37 Hz and the ON duty of 7.5%. The second frequency and the ON duty depend on the relationship between an available amount of energy stored in the primary capacitor and a time capable of maintaining a secondary output voltage using that amount of energy. With a 264 V AC input, power consumption in the standby mode is 360 mW×0.2 seconds=0.072 WS during operation and 35 mW×2.5 seconds 0.088 WS in a sleep mode. The average power consumption is 59 mW. With a low input voltage of 100 V, the power consumption in the standby mode becomes approximately half or less of that for the 264 V AC input. A switching frequency in the standby mode is extremely low at 0.37 Hz. This is outside the sonic frequency band and does not generate a grating noise.

In this embodiment of the switching power-supply unit, the frequency and the ON duty are determined as follows, assuming that an input capacity is 47 $\mu F$/400 V; a secondary output capacitor size is 1,200 $\mu F$/16 V; and a control power capacity is 1,000 $\mu F$/35 V.

Assuming that a guaranteed operating voltage for the power supply is 90 V to 400 V DC and the primary capacitor size is 47 $\mu F$, an available energy for 100 V AC (141 V DC) is:

$$47 \mu F \times (141^2 - 90^2)/2 = 0.277 J$$

Assuming that power needed for ensuring a secondary output voltage is 35 mW, the maximum inactivation time is:

$$0.277 J / 3.5 mW = 7.9 \text{ seconds}$$

This example uses 2.5 seconds with an allowance. An effective power in operation is 360 mW. Even if a power supply is soft-started, a power output becomes stable within approximately 10 ms. Thereafter, PWM control is performed to stabilize the secondary output voltage. This operation time can be just 10 ms or more.

Figure 3:
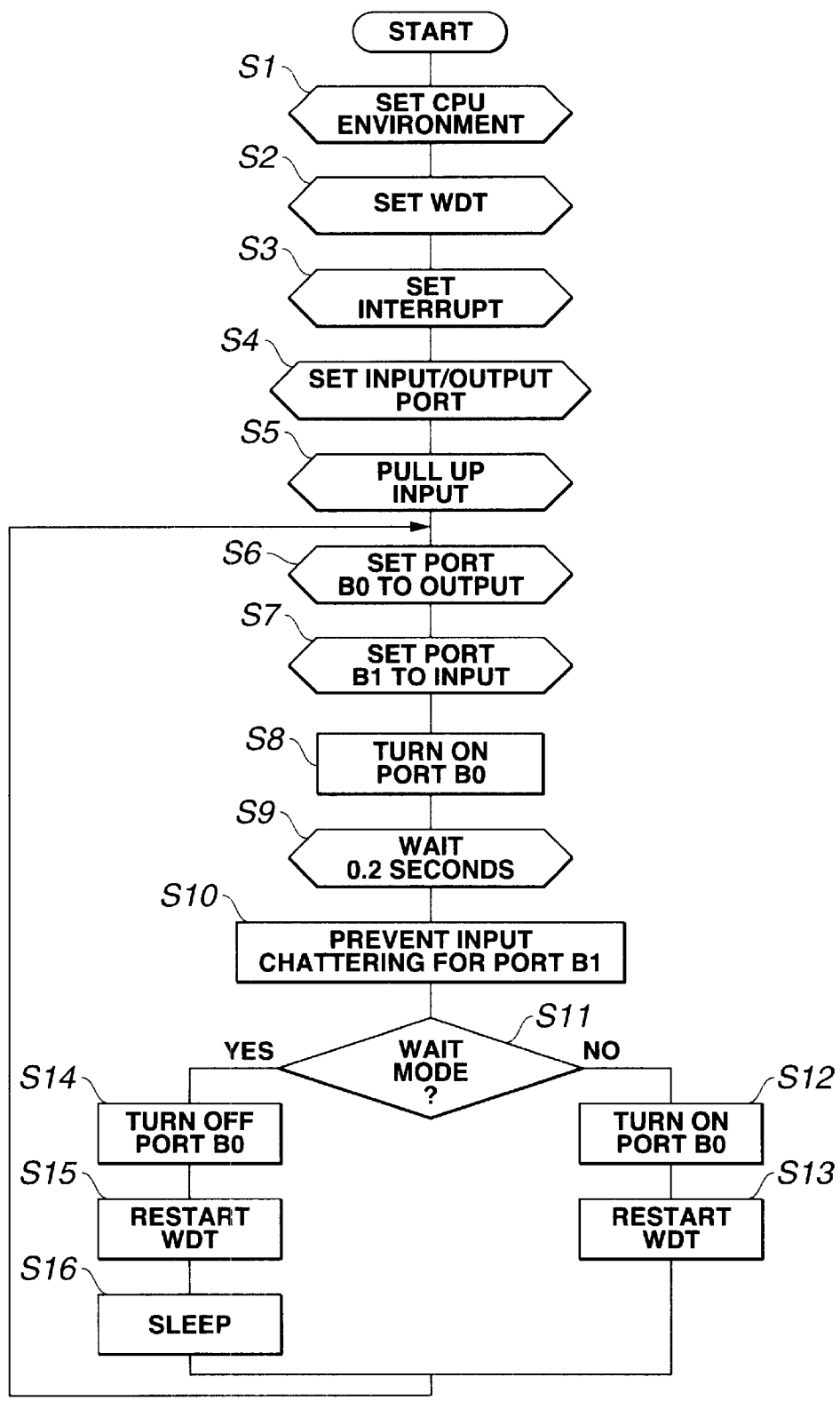
FIG. 3 is a flow chart showing a mode control procedure by a mode changeover controller in the switching power-supply unit.

As shown in the flow chart of FIG. 3 for this switching power-supply unit, the mode changeover controller 8 using the one-chip microcomputer performs the following steps at the operation startup: setting the CPU environment (step S1), setting the watchdog timer (WDT) (step S2), setting an interrupt (step S3), setting an input/output port (step S4), and pulling up input (step S5).

When the WDT is set at step S2, a header file is used to set the WDT to 2.5 seconds.

Then, a port B0 is set to output (step S6). A port B1 is set to input (step S7).

The port B0 output is then turned on (step S8) to activate the startup circuit 4 and the PWM control circuit 6.

For maintaining an output in the standby mode, the mode changeover controller waits (step S9) until expiration of a time (0.2 seconds) for forcibly operating the PWM control circuit 6.

Then, the port B1 is prevented against input chattering (step S10). When the same input condition continues for 2 seconds at the port B1, the chattering prevention processing accepts this input at the port B1 as an effective input (new STB). Effective inputs may be decided by majority.

The following conditions take effect assuming the most recent result (new STB) accepted as an effective input subject to the chattering prevention at step S10, the next most recent result (old STB) accepted as an effective input, and the current operation mode (dat STB).

dat STB=(new STB & old STB)|(new STB & dat STB)| (dat STB & old STB)

old STB=new STB

Based on these conditions, the standby mode is determined depending on whether dat STB is 1 or not. Namely, the mode changeover controller checks the operation mode if it is the standby mode when dat STB=1 or it is the normal mode when dat STB=0(step S11).

When step S11 results in NO, the normal operation mode takes effect. In this case, the port B0 output is turned on (step S12) to restart the WDT (step S13). Control then returns to step S6 and repeats processing from steps S6 to S13.

When step S11 results in YES, the standby mode takes effect. In this case, the port B0 output is turned off (step S14) to restart the WDT (step S15). The mode changeover controller waits in the sleep mode (step S16). After 2.5 seconds, control returns to step S6 and repeats processing from steps S6 to S16.

This switching power-supply unit uses the mode changeover controller 8 based on the programmable one-chip microcomputer. By modifying the program software, it is possible to freely set control times and provide a general-purpose power supply. If a program executes erratically, a soft reset is performed using the WDT. The switching power-supply unit resumes automatically.

What is claimed is:

1. A pulse-width modulation switching power-supply unit having a rectifier circuit for converting an alternating current from an alternating power supply to a direct current, a switching element for switching a current rectified by this rectifier circuit, and a primary coil for supplying a current to be switched by this switching element, said switching power-supply unit further comprising:

a transformer having a secondary coil for inducing power corresponding to current supplied to this primary coil;

DC output means for rectifying and smoothing a power induced at this transformer's secondary coil to output direct current power;

voltage control means for generating an error voltage based on a comparison between said direct current power output from said DC output means and a reference voltage;

pulse-width modulation controller for controlling a switching operation of said switching element according to said error voltage; and control means for controlling operations of said pulse-width modulation controller, wherein said control means, in a normal operation mode, continuously operates said pulse-width modulation controller so as to operate said switching element at a basic oscillation frequency, wherein said control means, in a standby mode, intermittently operates said pulse-width modulation controller so as to turn on said switching element at a given repetition interval and for a given time period, wherein that repetition interval is shorter than a time for decreasing an output voltage from said DC output means down to a guaranteed load operating voltage due to power consumption of the load and said DC output means in the standby mode and is longer than a time for entering a sonic frequency band, and wherein that time period is longer than a time for stabilizing an output from said DC output means and is longer than a time for entering a sonic frequency band, and wherein said control means further comprises a microcontroller and uses program software to variably set a control time such as a repetition interval in said standby mode using a watchdog timer and to supply a wakeup signal to a starter circuit of the pulse-width modulation controller at the repetition interval so as to stabilize a secondary output voltage.

2. The pulse-width modulation switching power-supply unit according to claim 1, wherein the voltage control means detects when a load current drops below a specified value, and wherein said control means performs a control operation for a standby mode when said current detection means detects a load current below a specified value for a specified period in a normal operation mode.

* * * * *